United States Patent [19]

Whitman

[11] Patent Number: 4,644,686
[45] Date of Patent: * Feb. 24, 1987

[54] ORNAMENTAL PLANT POT

[76] Inventor: William C. Whitman, 604 2nd Ave., North Brunswick, N.J. 08902

[ * ] Notice: The portion of the term of this patent subsequent to Apr. 24, 1996 has been disclaimed.

[21] Appl. No.: 433,750

[22] Filed: Jan. 16, 1974

Related U.S. Application Data

[63] Continuation of Ser. No. 264,974, Jun. 21, 1972, abandoned.

[51] Int. Cl.⁴ ............................ A01G 9/02; A01G 9/04
[52] U.S. Cl. ........................................... 47/71; 47/72; 47/79; 47/80
[58] Field of Search ................... 47/66, 71, 72, 79, 80, 47/81

[56] References Cited

U.S. PATENT DOCUMENTS 2,055,844  9/1936  Kneller ................................ 47/79

FOREIGN PATENT DOCUMENTS 1112153  5/1968  United Kingdom .................... 47/79

*Primary Examiner*—Steven A. Bratlie
*Attorney, Agent, or Firm*—Robert A. Green

[57] ABSTRACT

An ornamental plant pot made to resemble an object found in nature and including a construction which allows for drainage of excess liquid from the soil in the pot and enables dissipation of such liquid while precluding return of the liquid to the soil in the pot. The construction includes a concealed trough spaced below drain holes leading from the soil and means permitting the passage of ambient air to the trough and dissipation of the excess liquid.

2 Claims, 4 Drawing Figures

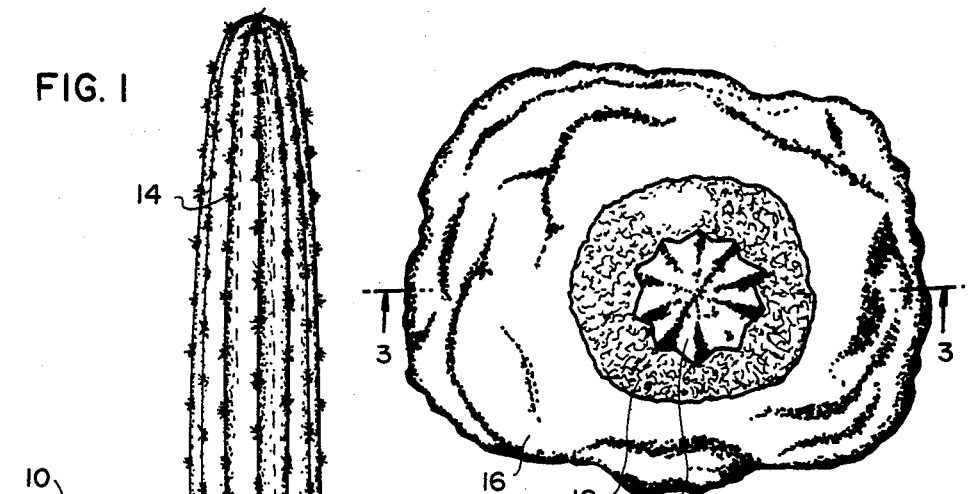
FIG. 1
FIG. 2
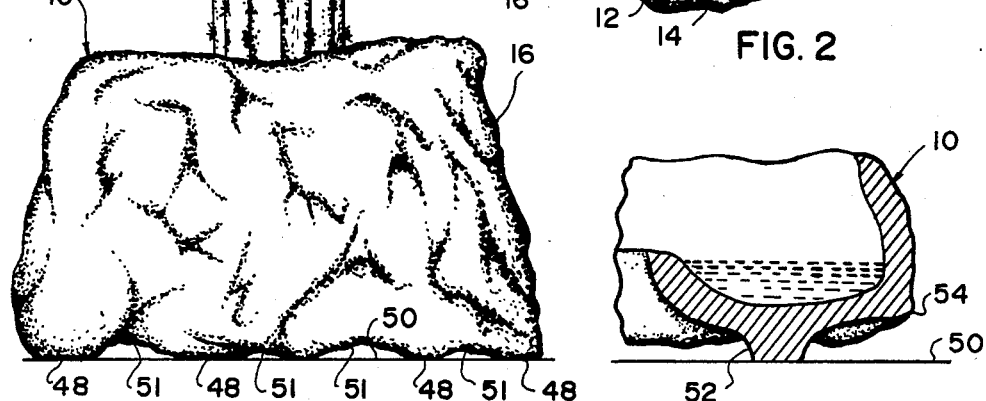
FIG. 4
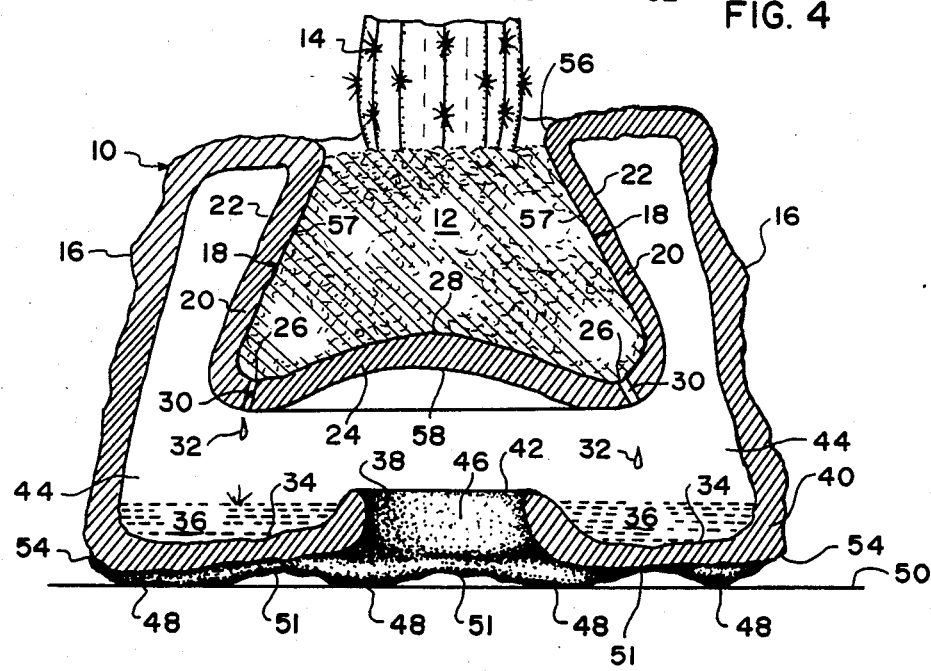
FIG. 3

ORNAMENTAL PLANT POT

This is a continuation of my application Ser. No. 264,974, filed June 21, 1972 now abandoned.

The present invention relates generally to plant pots and pertains, more specifically, to ornamental plant pots which are functionally superior to conventional plant pots and which may be made to resemble objects found in nature.

A wide variety of plant pots are available for growing and keeping live ornamental plants for aesthetic purposes. While attempts have been made to improve the appearance of the pots themselves in order to render the pots, as well as the plants, aesthetically appealing, most plant pots are still artificial in appearance. To a great extent, the commonly available clay, plastic, ceramic, metal and like pots have an appearance which is in discord with the natural beauty of the plant within the pot. Furthermore, many currently available pots have functional features which can hinder rather than aid plant growth and sustenance and those pots which have helpful features often lack aesthetic appeal.

It is therefore an object of the invention to provide plant pots having an appearance more in harmony with the natural beauty of the plants within the pots.

Another object of the invention is to provide an aesthetically appealing plant pot construction which will function more effectively in sustaining the life and growth of a plant in the pot.

Still another object of the invention is to provide an ornamental plant pot which allows for drainage of excess liquid from soil in the pot and enables dissipation of such liquid while precluding return of the liquid to the soil in the pot so as to preclude waterlogging and stagnation of the soil in the pot.

A further object of the invention is to provide an aesthetically appealing plant pot which can be made to resemble, quite closely, an object found in nature so as to be in aesthetic harmony with the plant in the pot.

A still further object of the invention is to provide a plant pot which has the advantages outlined above, yet has a configuration which is easily and economically fabricated in large numbers of uniform quality.

The above objects, as well as still further objects and advantages, are attained by the invention which may be described briefly as an ornamental plant pot which allows for drainage of excess liquid from soil in the pot and enables dissipation of such liquid while precluding return of the liquid to the soil, the pot comprising a soil container having an opening at the top thereof and a wall including a side and a bottom located axially below the opening, drain means extending through the wall in the vicinity in the lowermost portions thereof for enabling liquid to pass from the container through the wall thereof, a trough located beneath the drain means and spaced downwardly therefrom for receiving liquid from the drain means, means for maintaining the level of the liquid in the trough spaced below the drain means to preclude the return of liquid from the trough through the drain means, basal portions for supporting the pot upon a support surface, and a viewable external surface extending from the opening at the top to the basal portions, the external surface extending peripherally around the viewable perimeter of the pot to envelop the trough and conceal the trough from view, portions of the external surface being spaced above the basal portions to permit the passage of air between the support surface and the external surface for admitting ambient air to the liquid in the trough and dissipating the excess liquid.

The invention will be more fully understood, while still further objects and advantages thereof will become apparent, in the following detailed description of preferred embodiments of the invention illustrated in the accompanying drawing, in which:

FIG. 1 is an elevational view of a plant pot constructed in accordance with the invention with a plant therein;

FIG. 2 is a plan view of the plant pot and the plant;

FIG. 3 is an enlarged cross-sectional view taken along line 3—3 of FIG. 2; and

FIG. 4 is a fragmentary cross-sectional view similar to a portion of FIG. 3, but illustrating an alternate construction.

Referring now to the drawing, and especially to FIGS. 1 and thereof, a plant pot constructed in accordance with the invention is illustrated generally at 10. Plant pot 10 carries soil 12 in which there is planted an ornamental plant 14, in this instance, the plant being a cactus. Because it is most natural for a cactus of the type illustrated to be found among rocks, plant pot 10 is provided with an external surface 16 which bears the appearance of a rock. Thus, the plant pot 10 is in harmony with the plant 14 and the entire combination of plant and pot provides an aesthetically appealing unit.

In order to sustain the life and growth of the plant 14, while still maintaining an aesthetically appealing external appearance, the plant pot 10 is provided with an internal construction which not only contains the soil 12 in which the plant is rooted, but also allows for drainage of excess liquid from the soil and enables dissipation of that liquid while precluding return of the liquid to the soil so as to prevent waterlogging and stagnation of the soil. Turning now to FIG. 3, plant pot 10 includes a soil container 18 having a wall 20 with portions including a side 22 intersecting a bottom 24 at lowermost portions 26. The interior surface 28 of the bottom 24 has a convex configuration so that the lowermost portions 26 of the bottom 24 lie adjacent the intersection of the bottom 24 and the side 22. Drain means shown in the form of drain holes 30 extend through the wall 20 at the lowermost portions 26. Should excess moisture be present in the soil 12, the convex configuration of the interior surface 28 of the bottom 24 will direct such moisture to the drain holes 30 where the excess moisture will drain from the soil in the form of liquid droplets 32.

A trough 34 is located beneath the drain holes 30 and is spaced axially downwardly therefrom for receiving the liquid from the drain holes and collecting the liquid in a reservoir 36 provided in the trough 34. The trough 34 is generally annular in shape and includes an inner annular lip 38 and an outer annular wall 40. The uppermost edge 42 of the lip 38 is spaced downwardly from the lowermost portions 26 of the container wall 20 a sufficient axial distance to assure that the level of the liquid in the reservoir 36 of the trough 34 remains spaced below the drain holes 30 so that the liquid in the reservoir 36 cannot return through the drain holes 30 into the soil 12. In this manner, only the desired amount of moisture is retained in the soil and waterlogging and stagnation which might otherwise result from excessive moisture in the soil is precluded.

In order to permit dissipation of the liquid in the trough 34, ambient air is admitted into the cavity 44 above the trough through a generally central aperture 46 provided by the generally annular configuration of the trough 34. The external surface 16 of the plant pot 10 is provided with basal portions 48 which rest upon a support surface 50 and support the plant pot upon the support surface. The basal portions 48 preferably depend from the annular trough 34 and are spaced circumferentially around the trough. Portions 51 of the external surface 16 are spaced above the basal portions 48 to permit the passage of air between the support surface 50 and the external surface 16 to admit the ambient air to the aperture 46 and into the cavity 44 so that air will circulate within the cavity and enable the liquid in the trough 34 to evaporate.

Referring briefly to FIG. 4, where it may be difficult or aesthetically unacceptable to provide basal portions in the manner illustrated in FIGS. 1 and 3, the plant pot 10 may be provided with a plurality of depending feet 52, preferably three in number, for supporting the plant pot upon the support surface 50. The feet 52 are spaced inwardly from the outer periphery of the lower edge 54 of the plant pot so as to be essentially hidden from view. Thus, the feet 52 will provide a steady, secure support for the plant pot 10 while enabling the required circulation of air without detracting from the aesthetic appearance of the plant pot.

Returning now to FIG. 3, the soil container 18 is preferably provided with a configuration in which the bottom 24 extends radially beyond the radial extent of the opening 56 at the top thereof so that the interior 57 of the wall 20 of the container 18 slopes radially outwardly from the top toward the bottom. In this manner, soil 12 within the container 18 tends to remain in the container and will not drop out, should the plant pot 10 be tilted or upset. In addition, such a configuration increases the volume of the container while reducing the surface area of the soil which is exposed to the atmosphere so as to tend to reduce the escape of moisture from the soil by evaporation. Furthermore, the reduced area of the soil at opening 56 enhances the aesthetic appearance of the plant and plant pot unit in that the unit tends to resemble more closely a natural setting for the plant.

The exterior surface 58 of the bottom 24 preferably is concave so that the liquid droplets 32 will tend to run to the lowermost portions 26 and drop into the annular trough 34 rather than through the central aperture 46 where such moisture could fall upon the support surface 50 and possibly damage or disfigure that surface.

The plant pot 10 preferably is molded of a synthetic resin material and can be constructed in a unitary structure in which the outer wall 40 of the trough extends axially upwardly and is integral with the wall 20 of the container and supports the container above the trough 34 axially above the uppermost edge 42 of the inner lip 38 which is spaced radially inwardly from the outer wall 40. The external surface 16, which extends from the opening 56 all the way down to the basal portions 48, thus envelops the container 18 and the trough 34 and conceals the trough, together with the entire internal construction of the plant pot 10 from view, thereby providing the desired aesthetic effect.

While in the illustrated embodiments the external surface 16 is provided with the appearance of a rock, currently available molding techniques and materials enable the simulation of other objects occurring in nature. It therefore becomes practical to provide harmonious settings for a wide variety of plants which are to be potted. For example, plant pots may be fabricated to simulate logs, driftwood, coral, sea shells and other objects of nature, as well as an infinite variety of rocks and stone.

The above detailed description of embodiments of the invention is provided by way of example only. Various details of design and construction may be modified without departing from the true spirit and scope of the invention set forth in the appended claims.

The embodiments of the invention in which an exclusive property or privilege is claimed are defined as follows:

1. A plant pot comprising
   a first inner container and a second outer container formed as a unitary assembly,
   said first container including a side wall, the upper end of which defines an opening into which soil and a plant can be inserted, and a bottom wall which is convex and curves upwardly toward said opening, said bottom wall having drain holes at its periphery whereby excess water readily drains out of said first container,
   said second container including a side wall having an upper open end which is secured to the upper open end of said first container and is spaced from the wall of said first container to thereby provide a closed annular insulating space between the outer wall of said inner container and the inner wall of said outer container,
   said second container also including a bottom wall which is spaced below the bottom wall of said first container, the bottom wall of said second container having a central opening which provides communication between the interior of said second container and the outside air, the bottom wall of said second container which defines said central opening extending upwardly from the bottom wall to form an annular waterreceiving trough surrounding said central opening therein, whereby any water, which runs from said first container through said drain holes in its bottom wall and into said annular trough, evaporates therefrom due to air circulation through said central aperture into the space between said first and second containers,
   the outer surface of the bottom wall of said second container being provided with support legs which raise said plant pot above the surface on which it is supported whereby air can circulate from outside the plant pot into the inside of said plant pot through said central opening in said bottom wall to thereby promote water evaporation.

2. The plant pot of claim 1 wherein said second container is irregularly shaped so that the plant pot has the shape and appearance of a rock or other object found in nature.

* * * * *